Aug. 8, 1972     G. H. TESCH ET AL     3,682,739

SLITTING FOAM RUBBER PRODUCTS

Filed April 24, 1970     6 Sheets-Sheet 1

INVENTORS
GUNTER HORST TESCH
JOHANNES JAKOBUS VINCENT COLIJN

BY *Arthur Schwartz*

ATTORNEY

Aug. 8, 1972  G. H. TESCH ET AL  3,682,739
SLITTING FOAM RUBBER PRODUCTS
Filed April 24, 1970  6 Sheets-Sheet 2

INVENTORS
GUNTER HORST TESCH
JOHANNES JAKOBUS VINCENT COLIJN
BY *Arthur Schwartz*
ATTORNEY

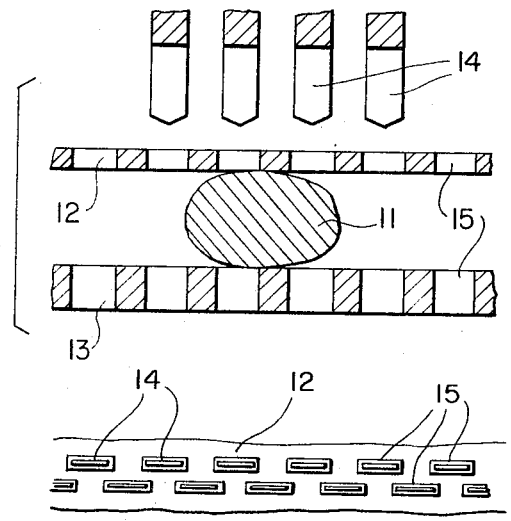
FIG. 7
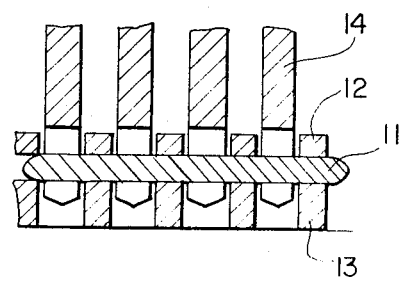
FIG. 9
FIG. 8
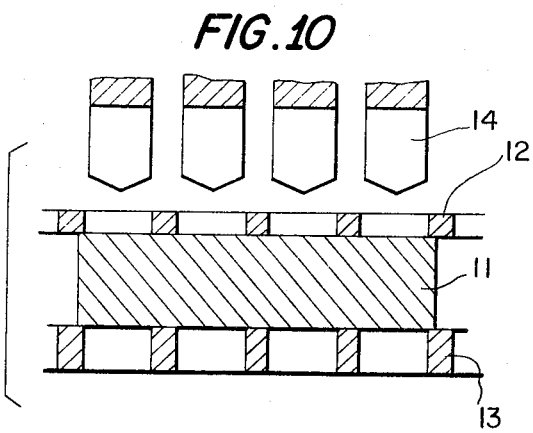
FIG. 10
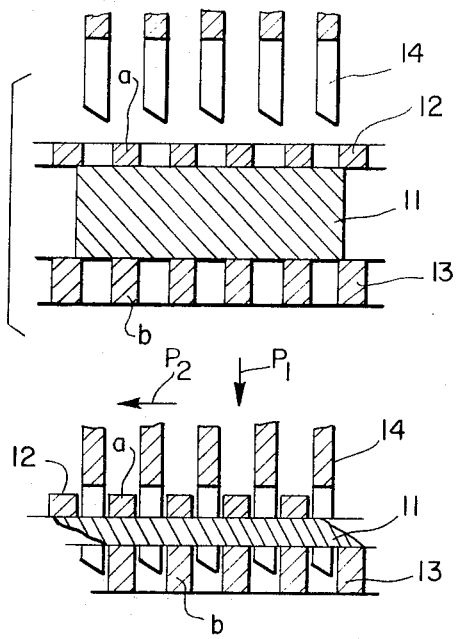
FIG. 12
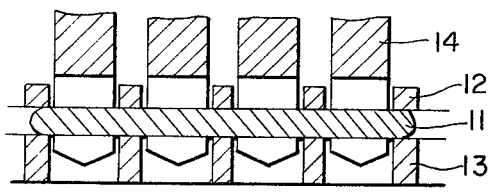
FIG. 11
FIG. 13

United States Patent Office 3,682,739
Patented Aug. 8, 1972

3,682,739
METHOD OF SLITTING FOAM RUBBER PRODUCTS
Gunter Horst Tesch and Johannes J. V. Colijn, Fribourg, Switzerland, assignors to Breveteam SA, Fribourg, Switzerland
Filed Apr. 24, 1970, Ser. No. 31,519
Claims priority, application Switzerland, Apr. 25, 1969, 6,466/69
Int. Cl. B32b 31/00
U.S. Cl. 156—293      9 Claims

ABSTRACT OF THE DISCLOSURE

A method wherein foam material of rubber or plastic is provided with at least two series of slits extending in different directions through the material and at least partly intersecting each other.

BACKGROUND OF THE INVENTION (1) Field of the invention

The present invention relates to articles of foam materials, especially plastics, and to a method of producing the same.

(2) Description of the prior art

Articles of foam materials contain a large number of very small cells or cavities the walls of which are closed in one type of foam material and open in another type. The walls of these cells together form a very large surface area per unit. Even if the individual cells of such an article have relatively thin walls, the weight of this article is relatively heavy and cannot be reduced beyond a certain limit.

A foam material with small cells has a certain stiffness which renders it unsuitable for many purposes. If the foam material is employed as a sound-absorbing covering of wall surfaces and the like, the cells depending upon their size have a selective effect upon the sound frequency so that sounds of certain frequencies are less absorbed than those of other frequencies.

Articles of foam materials and especially foam plastics appear undesirably stiff to the touch and therefore articles for personal use such as pillows, covers or the like which are made of foam materials have not provided satisfactory and are very rarely used. Furthermore, their degree of ventilation is very low.

Although attempts have been made to overcome these disadvantages in mattresses which are made of foam rubber or foam plastic by providing them with holes in one side which are formed directly by molding the mattress body in a suitable mold, such a mode of production is very expensive. Pillows which are made in this manner are still too stiff. Attempts have also been made to overcome these disadvantages by breaking up the foam material into small pieces. This, however, results in new disadvantages such as an insufficient elasticity and the difficulty in forming flat surfaces and of properly keeping the many small pieces together so as to form a unit which is sufficiently compact.

It has further been proposed to provide sheets or pads of foam rubber or foam plastic with parallel rows of slits and to draw them in a direction transverse to the slits so as to distort them to a honeycomb shape in which they are then set and fixed. This results in a certain increase in volume which, however, extends only in one direction. Since the walls of the honeycomb structure of such foam elements remain relatively stiff, they are not suitable for being used as pillows or the like.

SUMMARY OF THE INVENTION

It is an object of the present invention to produce a foam material which has a series of advantages over similar materials as previously produced, which advantages also render this material suitable for being employed for numerous purposes for which the known materials could not be used.

For attaining these advantages, it is a characteristic feature of the foam material according to the present invention that a body of this material is provided with at least two series of slits which extend transversely to and through each other and that each of these series of slits consists of a large number of substantially parallel slits and each slit of one series intersects at least one slit of the other series.

A feature of the method of producing an article of such a foam material consists in compressing an unfinished foam blank between two pressure surfaces, in cutting one series of slits in one direction through this compressed blank, and in then compressing the once-slitted blank once more in a different direction and in cutting another series of slits in this direction through the blank.

BRIEF DESCRIPTION OF THE DRAWINGS

The features and advantages of the present invention will become further apparent from the following detailed description thereof which is to be read with reference to the accompanying drawings, in which:

FIGS. 7 to 13 illustrate diagrammatically several methods of producing the foam elements according to the invention;

FIGS. 14 to 16 illustrate diagrammatically different possibilities of intersection of the slits; while

DESCRIPTION OF THE PREFERRED EMBODIMENTS

Figure 1:
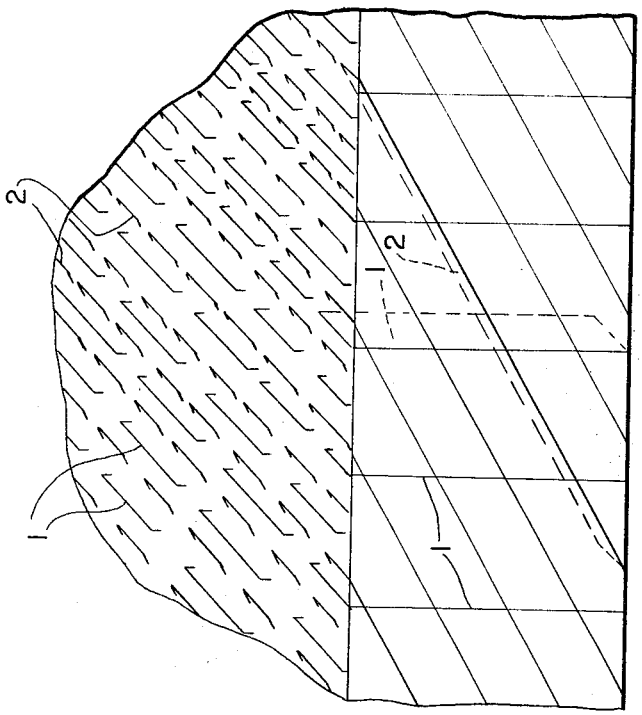
FIG. 1 shows a perspective view of a part of a foam element according to the invention.

Referring to the drawings, FIG. 1 illustrates a cutaway portion of a body of foam or foam plastic according to the invention which is provided with two different series of slits 1 and 2, in which the slits of each series extend substantially parallel to each other. The opposite outer surfaces of the foam body are assumed to be flat and parallel to each other and the slits 1 extend substantially at right angles to these outer surfaces and form parallel rows of separate slits which are in alignment with each other. The slits of two adjacent rows are in this case shown as being staggered relative to each other.

The individual slits 2 of the second series are inclined relative to the slits 1 and are in this case of a shorter length than the slits 1 and are also spaced at shorter distances from each other within each row. Each slit of one series intersects several slits of the other series. This results in a very loose structure which has a series of advantages.

A first advantage of such a structure consists in the increase in volume of the foam material without any increase in weight and quantity of the material. Consequently, a foam element which is slitted in accordance with the invention requires considerably less material than one which is not slitted. This advantage is especially desirable when the foam material according to the invention is used as a filler, for example, for filling out empty spaces in containers. The saving in material which is attained by the increase in volume reduces the cost of such foam elements very considerably. This new product has, however, the additional advantage of having a very high flexibility. It will therefore cling closely to the article packed therein and protect it very securely from damage.

If a foam element of a conventional type is slitted in a known manner only by means of continuous cuts through the cells in one direction, it is still very stiff and inflexible in comparison to the new product. Since according to the invention the walls of the cells are cut several times by a second series of slits at an inclined direction to the first series, they are rendered highly elastic. If a pressure or bending force is exerted upon a particular part of such a foam element, the walls of the slits will spread apart adjacent to the point of pressure, while when the pressure is relieved, the walls will again contract elastically. Thus, even though the foam material as such is similar to tough elastic rubber, the product by being slitted according to the invention is rendered very soft and pliable.

While an increase in volume of bodies of foam material which are slitted only in one direction between the cells can occur substantially only in a direction transverse to the slits, foam elements which are provided with two different series of slits in different directions will expand in volume in two different directions.

Figure 2:
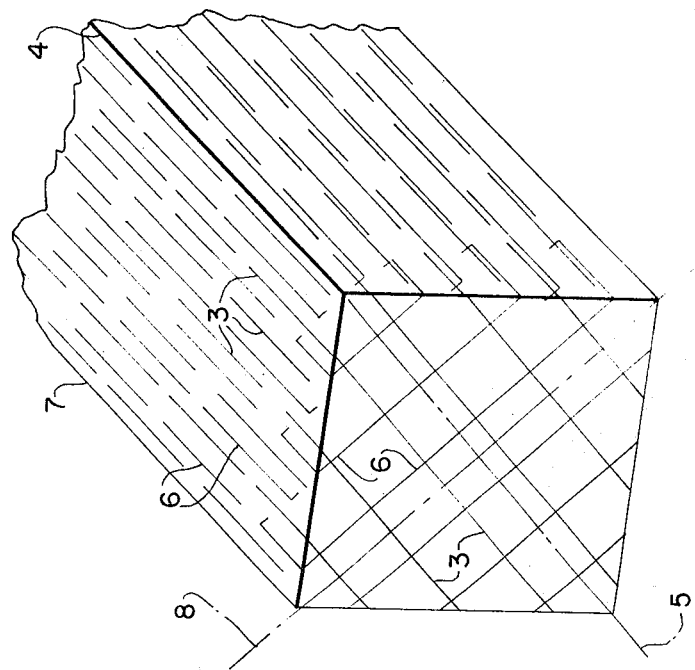
FIG. 2 shows a prespective view of a foam element according to another embodiment of the invention.
Figure 3:
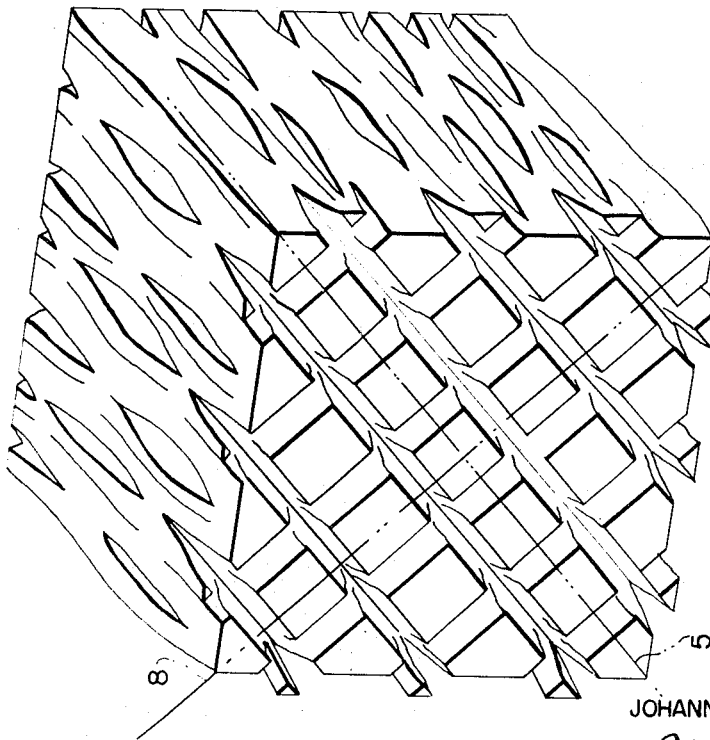
FIG. 3 shows another perspective view of the foam element according to FIG. 2 in an expanded condition.

This two-dimensional expansion according to the invention may be utilized for different purposes, as illustrated, for example, in FIGS. 2 and 3. The two rectangular bodies as shown in these drawings are provided in an identical manner with slits of two different series. The slits 3 of the first series extend longitudinally substantially parallel to a plane 5 which extends diagonally between the opposite corners 4 of the rectangular body, while the slits 6 of the second series extend longitudinally substantially parallel to a plane 8 which extends between the two other opposite corners 7 of the rectangular body. The two series of slits 3 and 6 therefore extend substantially in directions at right angles to each other. A foam body which is provided with these two series of slits possesses a very high flexibility and is therefore suitable for being employed, for example, for being wrapped around containers or pipes for insulating the same.

FIG. 3 illustrates the extensibility of the slitted foam body as shown in FIG. 2 which by applying a traction in the direction of the two diagonal planes 5 and 8 has been increased to a considerably larger volume.

Depending upon the directions of the two series of slits, the cross-sectional size of the slits and their length and distance from each other within each row and from row to row, the foam material according to the invention may be provided with different properties especially insofar as its degree of softness or flexibility or other physical properties are concerned such as its sound-absorbing capacity, heat insulation, permeability to air, etc.

Figure 4:
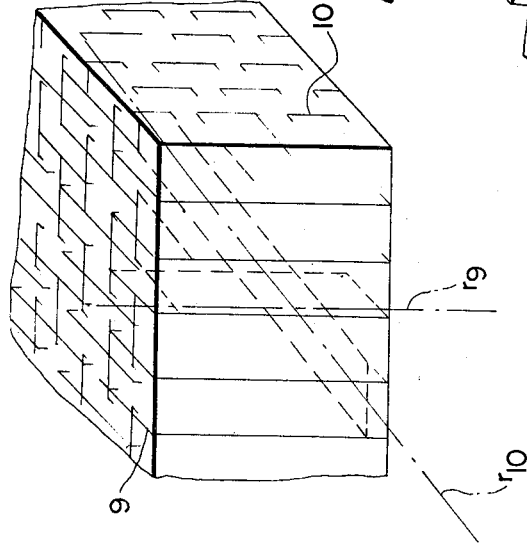
FIG. 4 shows a perspective view of a foam element according to a further embodiment of the invention.

A flat body of foam rubber or foam plastic as illustrated in FIG. 4 has a very loose structure which renders it suitable especially as a basic material for the production of pillows, bed covers, bed spreads and the like. This foam material is again provided with two different series of slits. The slits 9 of the first series are disposed within substantially parallel planes which extend at right angles to the two opposite outer surfaces of the body. The longitudinal axes of each row of these slits 9 extend likewise at right angles to these outer surfaces.

The slits 10 of the second series are likewise disposed within parallel planes and likewise extend at right angles to the two outer surfaces of the body but transverse to the planes of the slits 9 of the first series. The longitudinal areas $r_{10}$ of slits 10 extend, however, at an inclined angle to the two outer surfaces of the body.

In a test, a pad of polyether foam plastic of a thickness of 50 mm., a volumetric weight of 19 kg./m.$^3$ and a compressive strength of 5 p./cm.$^2$ was treated in accordance with the invention. The slits of both series were substantially identical and had a length of 4 mm., as seen in a direction vertical to the plane $r_9$ of FIG. 4, the slits within the plane of each row were spaced at a distance of 2.6 mm. from each other, and the planes of two adjacent rows of the same series were spaced at a distance of 1.7 mm. from each other. The effect of the different slits was noticeable especially physiologically by a much softer feeling of the material when touched or gripped.

When such a foam-plastic body is being bent, the doubly slit walls spread apart as if they were swelling. Since the individual slits 10 are shorter than the distance between the two opposite outer surfaces of this body, the entire mass of foam plastic of this body is held securely together as a single unit from which no particles will be separated.

Figure 5:
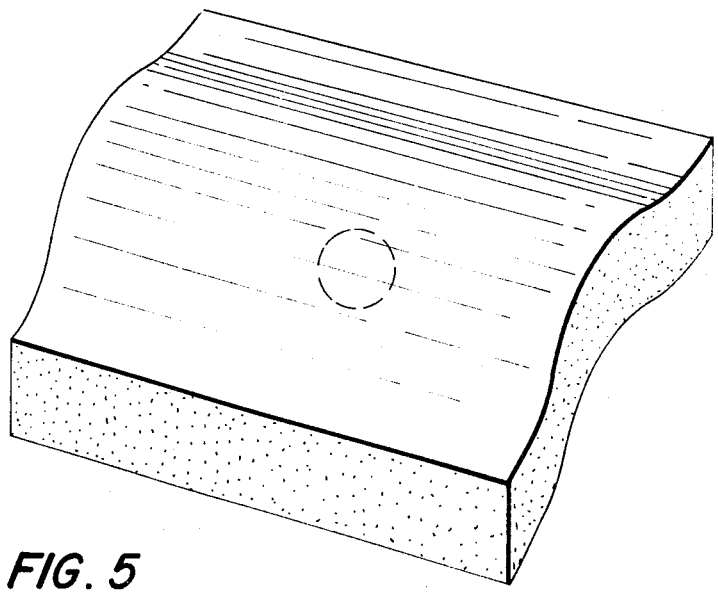
FIG. 5 illustrates the behaviour of a flat foam element of a known type.
Figure 6:
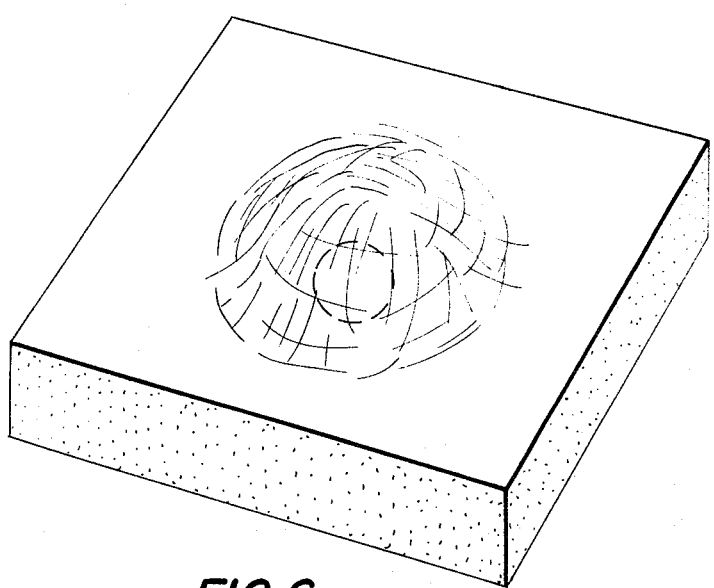
FIG. 6 illustrates the behaviour of a flat foam element according to the invention.

The flexibility of a sheet of foam material will be apparent when it is used for covering a ball lying on a table. while an unslitted sheet of foam material will touch the table surface only at a very large distance from the ball, a sheet which is provided with slits extending only in one direction will touch the table surface at points which are located very closely to the ball at two opposite sides thereof, as illustrated in FIG. 5, while at the other two opposite sides of the ball two upwardly curved channels are formed. If, however, the sheet of foam material is provided with two series of slits in accordance with the invention, the material will touch the table surface very closely from the ball at all sides and around the latter, as indicated in FIG. 6. Such a sheet is therefore very suitable for draping purposes.

Figure 4A:
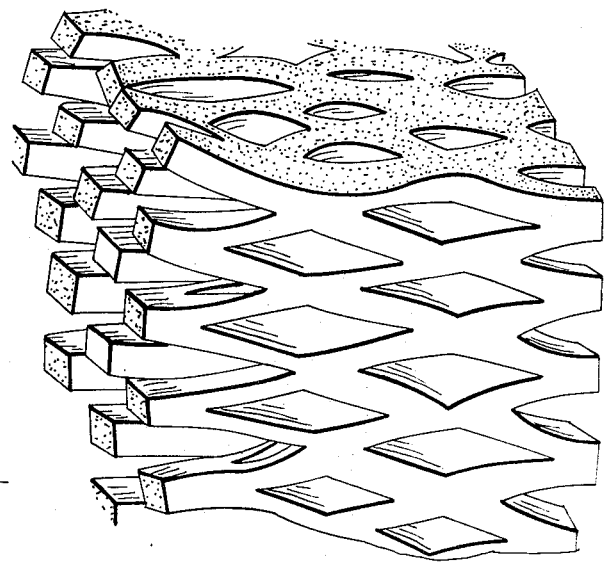
FIG. 4a shows a perspective view of the foam element according to FIG. 4 is an expanded condition.

FIG 4a illustrates the body of foam material according to FIG. 4 when it is slightly drawn apart, as it occurs, for example, when such a body is spread like a down cover over a bed. Due to the two series of slits, its outer surfaces will then be divided into a countless number of small pins or studs which are interlinked with each other in the longitudinal and transverse directions by connecting webs. These small pins will bend under the slightest pressure and will again straighten out as soon as the pressure is removed. If placed upon a round object, for example, a ball as illustrated in FIG. 6, the small pins will spread apart.

The small pins may also be maintained permanently in the spread position. This may be effected especially by securing the outer edges of the foam body in a fixed position, for example, by sewing them to a textile covering material. The foam material may, however, also be set in the spread position by impregnating it with dispersions of resins and by thereafter evaporating the solvent or by setting the foam material permanently in its spread condition by cooling it after it has been heated and expanded. Thus, for example, the apertures formed in the foam material when expanded may be filled with a less expensive large-cellular foam plastic. The body of foam plastic according to the invention then forms the supporting framework which possesses the required elasticity and durability, while the filler as such when not supported by such a framework has no durability nor any stability of shape.

Another product may be attained according to the invention by blowing a mass of fiber tufts into the body of foam material when it is drawn out to its expanded position. The fibrous material may consist, for example, of polypropylene of a high density and a good resilience.

The fibers are preferably made of a thickness of approximately 20 denier, are coarsely curly and cut to a length of approximately 6 cm. An aperture which has been formed by drawing apart one slit may contain a fiber tuft consisting of 100 to 1000 individual fibers. When the traction upon the body of foam material is released and tends to snap back to its original condition, the fiber tufts will be clamped between the webs and will thus maintain the apertures permanently in the open position.

Aside from being enclosed so as to form a cover similar to a down cover, the foam material according to the invention may also be employed as a decorating material or as a material for many kinds of wearing apparel, such as scarves, hats, pads, special parts of dresses, costumes, and the like.

The method of producing different articles or bodies of foam rubber or foam plastic in accordance with the invention will now be briefly described with reference to the diagrammatic illustrations as shown in FIGS. 7 to 13.

FIGS. 7 to 9 illustrate a blank 11 of a foam material of any suitable shape which is compressed between two plates 12 and 13 which are provided with slits 15 through which blades 14 are then passed from above so as to cut entirely through the compressed body of foam material. After this cutting operation, blades 14 and then also plates 12 and 13 are retracted from the foam body 11.

In a second step of the operation, the same body 11 of foam material is first turned about an angle to the previous position and then compressed once more between the same pair or another pair of equally slitted plates 12 and 13 or between a pair of plates which are provided with different slits. In this compressed position, the foam body 11 is pierced once more by the blades 14 which have a cross-sectional size substantially in accordance with the slits in plates 12 and 13.

FIGS. 10 to 13 illustrate diagrammatically the method of producing a flat article of foam rubber or foam plastic in accordance with the invention.

In the first step of this method, as shown in FIGS. 10 and 11, the flat blank 11 is again compressed between slitted plates 12 and 13 and then pierced vertically by the blades 14 which are guided in corresponding slits in these plates.

In the second step of this method, as shown in FIGS. 12 and 13, the once-slitted blank 11 is once more compressed in the same position in which it was previously compressed and slitted according to FIGS. 10 and 11, but in such a manner that during the compression by the upper plate 12 in the vertical direction as shown by the arrow $P_1$, this upper plate 12 is also shifted for a certain distance in the lateral direction of the arrow $P_2$ so that the material of the blank 11 is laterally deformed. When the blank is then again pierced by the blades 14 in a vertical direction, the second series of slits which are then cut are inclined relative to the slits of the first series. When the blades 14 and then also the slitted plates 12 and 13 are retracted from the twice-slitted body of foam material, the latter will appear in cross section substantially as illustrated in FIG. 1.

If in the method of production as last described the once-slitted blank before being laterally displaced during its second compression is turned about a right angle within the horizontal plane of the plates 12 and 13 and is then provided with the second series of cuts, the twice-slitted body of foam material will have an appearance substantially as illustrated in FIG. 4.

By reversing the position of the blank before the second compressing and cutting operations, that is, by placing it upside down between the plates 12 and 13, still other internal structures of the twice-slitted foam body will be attained.

There is, however, a limit to the structural shapes which may be attained according to the invention insofar as the width of the blades for the cuts through the laterally deformed compressed foam body may not be as large as the original thickness of the blank since the body of the blank would otherwise fall apart. Since the limits of the admissible widths of the blades in relation to the thickness can be easily determined by tests, there is no need to specify these limits in this description.

Figure 14:
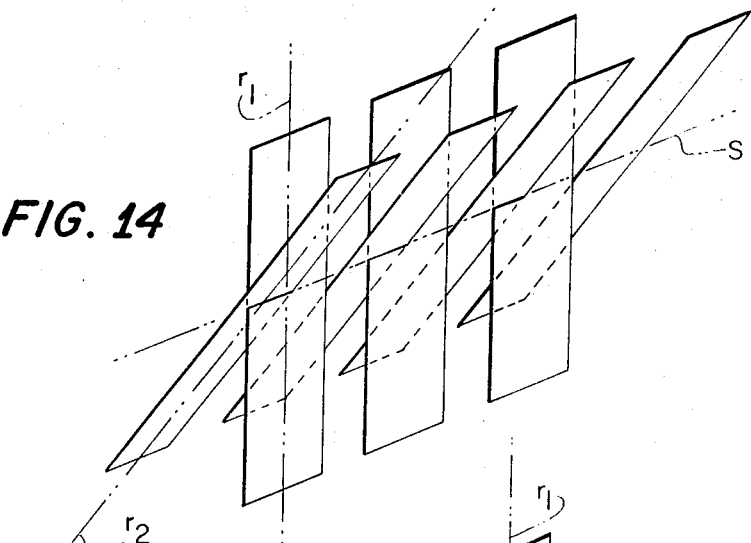
Figure 15:
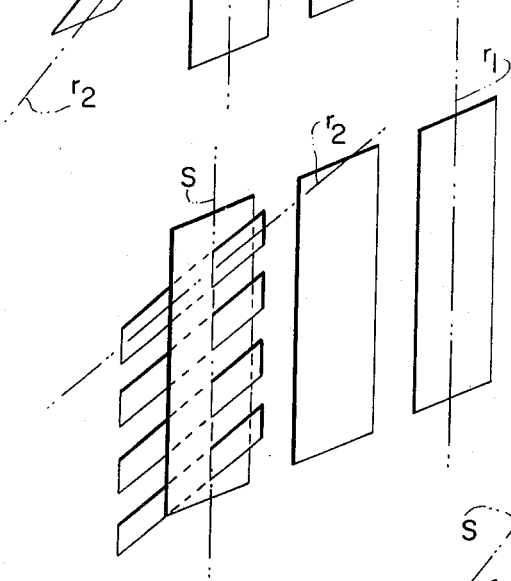
Figure 16:
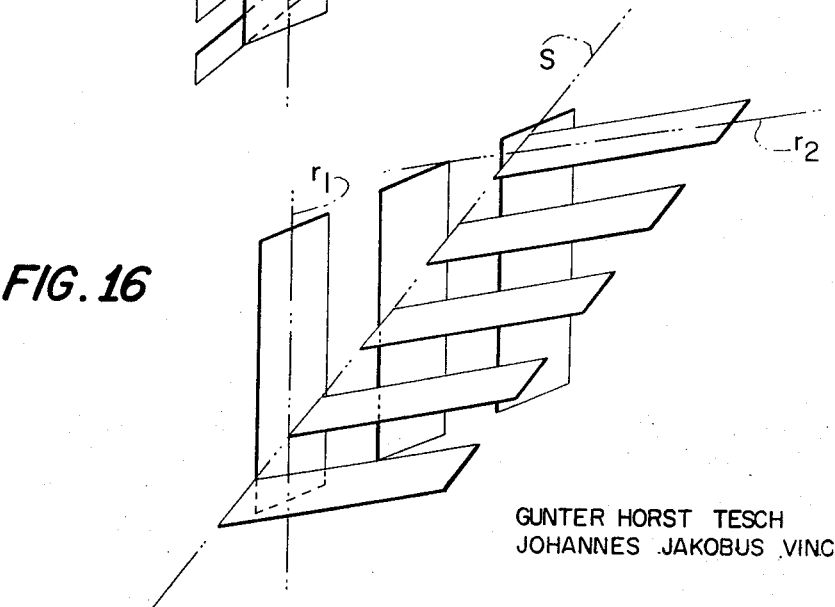
Figure 17:
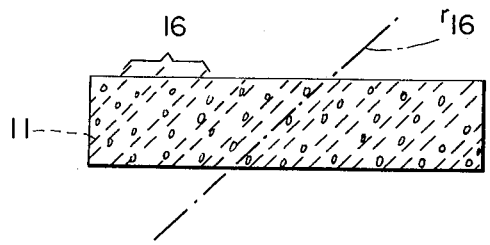
FIGS. 17 to 20 illustrate another method of production of the foam elements according to the invention.

Depending upon the direction in which the blank of foam material is being compressed in the first and second steps of the method, there are a variety of possibilities of intersecting the two series of cuts. Some of these possibilities are illustrated in FIGS. 14 to 16, in which the longitudinal axes of the slits of the two series are designated by the letters $r_1$ and $r_2$ and the lines of intersection between the slits of one series with those of the other series are designated by the letter $s$.

Figure 18:
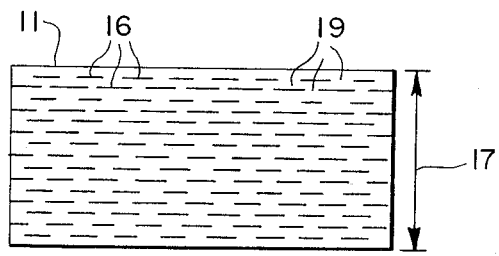

A further embodiment of the invention which may be produced in a conveyer-line production is illustrated in FIGS. 17 to 20. As already described with reference to FIGS. 10 to 13, the body 11 of foam material is first provided with a first series of slits which may either have a vertical downward direction $r_{16}$ or an inclined direction as indicated in a side view in FIG. 17. As seen from above in accordance with FIG. 18, all slits 16 of this first series will then be disposed within parallel planes. The slits within two adjacent planes are then staggered relative to each other and the ends of the slits within one plane overlap the ends of the slits of the adjacent plane so that a network of laminations of foam material is formed which coheres similar to a honeycomb and may be drawn out practically without any effort in the direction transverse to the planes of the slits, that is, in the direction of the double arrow 17 as shown in FIG. 18.

Figure 20:
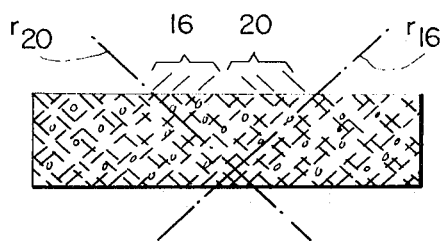

The slitted body of foam material may thus be drawn out to an outer size of two to three times of its original size and practically so far that the laminations 19 will be disposed substantially transverse to the planes of the slits. After it has been drawn out to this expanded position the body 11 is once more compressed between the two plates 12 and 13 in a manner similar to that as illustrated in FIGS. 12 and 13. The two plates 12 and 13 are then laterally shifted relative to each other so that the direction $r_{20}$ of the second series of slits 20, as shown in FIG. 20, extends at a substantially right angle to the direction $r_{16}$ of the first series of slits and both series may be inclined at substantially equal angles or at different angles to the flat outer surfaces of the body.

Figure 19:
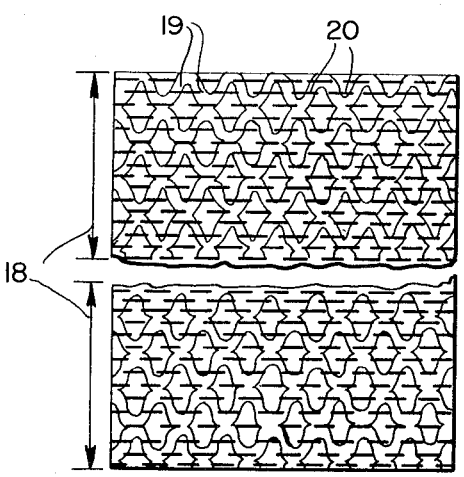

For cutting the second series of slits into the body 11, the latter is in this case not turned as it is done in the embodiments as previously described. Therefore, the planes of the slits of the second series extend parallel to the planes of the slits of the first series. FIG. 19 shows a top view of the body 11 of foam material which has been drawn out to the length as shown by the arrow 18. This drawing shows clearly that the laminations 19 of this extended body which are formed by the slits are now directed substantially transverse to the planes of the slits. The planes of the slits 20 of the second series are spaced in this case at such short distances from each other that each lamination 19 will be intersected at least once by a plane of these slits 20. These slits 20 within each plane are spaced from each other at such a distance that, although each lamination 19 will be cut-in at least once, it will not be cut through entirely.

In a test, a pad of polyethylene foam plastic of a thickness of 50 mm. and a unit weight of 25 kg./m.$^3$ and a compressive strength of 35 p./cm.$^2$ was treated in the manner as described above. The slits of both series were equal and of a length of 24 mm., the adjacent slits within each plane were spaced at a distance of 5 mm. from each other, and the slits of the adjacent planes of the same series were spaced at a distance of 3 mm. from each other. The difference in the degree of softness to the touch between this product and the foam plastic before it was slitted or even the same foam plastic which was slitted in only one direction was astounding.

In accordance with the invention it is also possible to provide a body of foam material with more than two series of slits extending in different directions, for example, if the foam body should be elastic and extensible in three directions or dimensions.

Finally, the cross-slitted and extended foam material according to the invention may be subjected to an after-treatment by means of hot air, steam, gases, fluids, or chemicals, especially for further loosening, deforming or spreading the product, or by compressing, deep-drawing, stretching, coating, spraying it or by impregnating it with resins, coloring substances, or other plastics in the form of dispersions, solutions or hot liquids.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A method of producing in a body of a normally elastic foam material at least two series of slits extending in two different directions through said body, comprising the steps of compressing a blank of said material between two pressure surfaces, cutting a first series of substantially parallel rows of slits in one direction through said compressed body, and cutting a second series of substantially parallel rows of slits through said compressed body but in a different direction, said slits of each row of each series extending substantially parallel to the slits of the other rows of the same series.

2. A method as defined in claim 1 in which said blank having two opposite parallel outer surfaces, is compressed between two pressure surfaces in a direction obliquely inclined relative to said outer surfaces, while said first series of slits are cut through said compressed body, and in which said blank is again compressed between two pressure surfaces and likewise in a direction obliquely inclined relative to said outer surfaces but differing from said first direction of compression, and said second series of slits are cut through said body.

3. A method as defined in claim 2 in which said slits of the adjacent rows of said first series are substantially parallel but staggered relative to each other so that the ends of each slit of one row of said first series extend beyond the ends of two longitudinally adjacent slits of an adjacent row.

4. A method as defined in claim 1, in which for cutting both series of slits through said body, said body is twice compressed between two pressure surfaces and all of said slits being cut in the same direction relative to said pressure surfaces, and in which while the once-slitted body is being compressed the second time, the pressure surfaces are laterally shifted relative to each other, whereby said body is deformed to an inclined position in which its opposite outer surfaces engaging with said pressure surfaces are likewise shifted to each other and relative to the normal position of said outer surfaces.

5. A method as defined in claim 4, in which the twice-slitted body is again compressed between two pressure surfaces but in a direction different from the directions of the two previous compressions, and is then provided with a third series of slits extending in directions differing from the directions of the first and second series of slits.

6. A method as defined in claim 4 in which said blank is first compressed between, and shifted laterally by, said pressure surfaces and said slits of said first series are cut through said compressed blank in directions parallel to each other and within planes parallel to said shifted position, said slits of adjacent rows of said first series being substantially parallel but staggered relative to each other so that the ends of each slit of one row of said first series extend beyond the ends of two longitudinally adjacent slits of an adjacent row, and further comprising the steps of relieving the pressure upon said once-slitted blank, exerting a traction upon said blank so as to expand the same in a direction transverse to the planes of said rows of said first series of slits so that the laminations formed by the walls of adjacent slits of adjacent rows of said first series will be oriented substantially transverse to the original planes of said first slits and form a substantially honeycomb-shaped network, compressing said expanded body to a second shifted position laterally opposite to said first shifted position, and cutting said rows of slits of said second series into said compressed expanded body in directions parallel to each other and within planes parallel to both shifted positions so that said second slits will intersect said laminations in the longitudinal direction of the latter.

7. A method as defined in claim 6 further comprising the step of relieving said compression and said traction on said expanded twice-slitted body so that, due to its inherent resilience, said body will then return to the position in which the walls of each of said slits substantially engage with each other.

8. A method as defined in claim 6 further comprising the step of fixing said expanded twice-slitted body so as to remain substantially in said expanded condition.

9. A method as defined in claim 6 further comprising the step of at least partly filling the channels defined by the walls of said expanded slits of said first series with an elastic material so that said walls of each slit of said first series will not engage with each other under the inherent resilience of the material of said body when said compression and traction on said body are finally relieved.

References Cited

UNITED STATES PATENTS

| 2,768,924 | 10/1956 | Wright | 156—257 X |
| 3,009,848 | 11/1961 | Simon | 161—159 X |
| 3,042,562 | 7/1962 | Peterson | 156—257 X |
| 3,044,918 | 7/1962 | Wagner | 161—159 X |
| 3,154,607 | 10/1964 | Struthers | 83—19 X |

FOREIGN PATENTS

| 730,063 | 3/1966 | Canada | 161—123 |
| 756,383 | 9/1956 | Great Britain | 161—117 |

WILLIAM A. POWELL, Primary Examiner

U.S. Cl. X.R.

83—19, 36, 176; 156—93, 252, 257, 513; 161—64, 67, 112, 117, 159; 234—1; 264—156